Dec. 24, 1935.  R. W. REGENSBURGER  2,025,124
STUNNING PEN
Filed July 10, 1933    4 Sheets-Sheet 3

Richard W. Regensburger
INVENTOR

WITNESS

BY
ATTORNEY

Dec. 24, 1935. R. W. REGENSBURGER 2,025,124
STUNNING PEN
Filed July 10, 1933 4 Sheets-Sheet 4
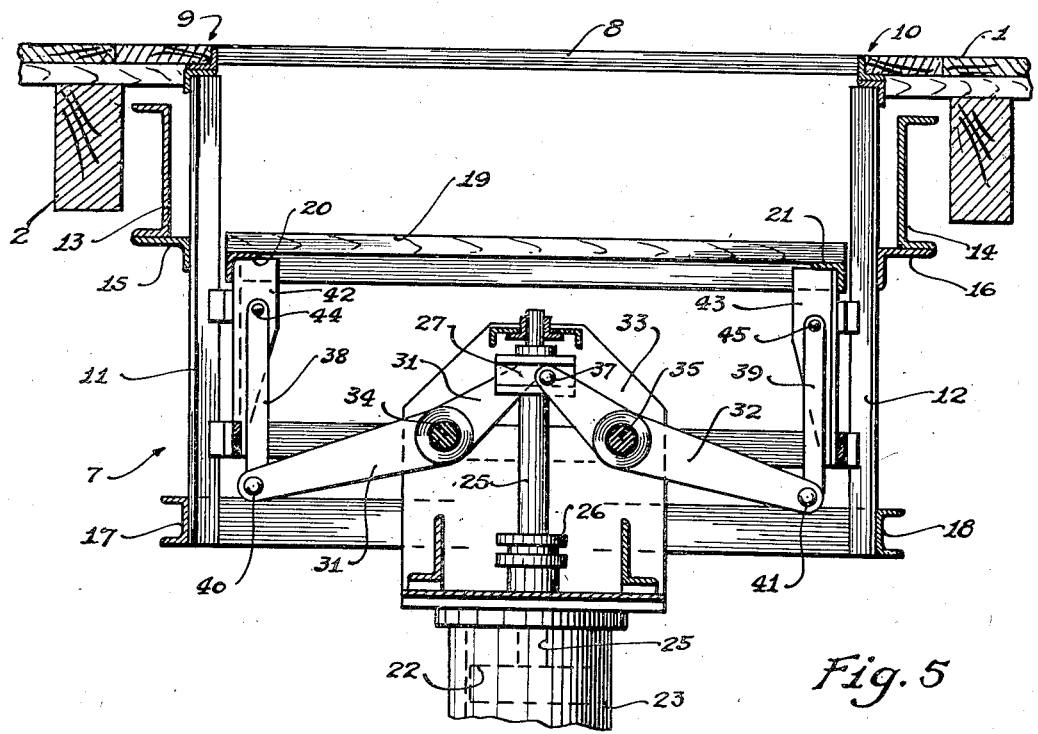
Fig. 5
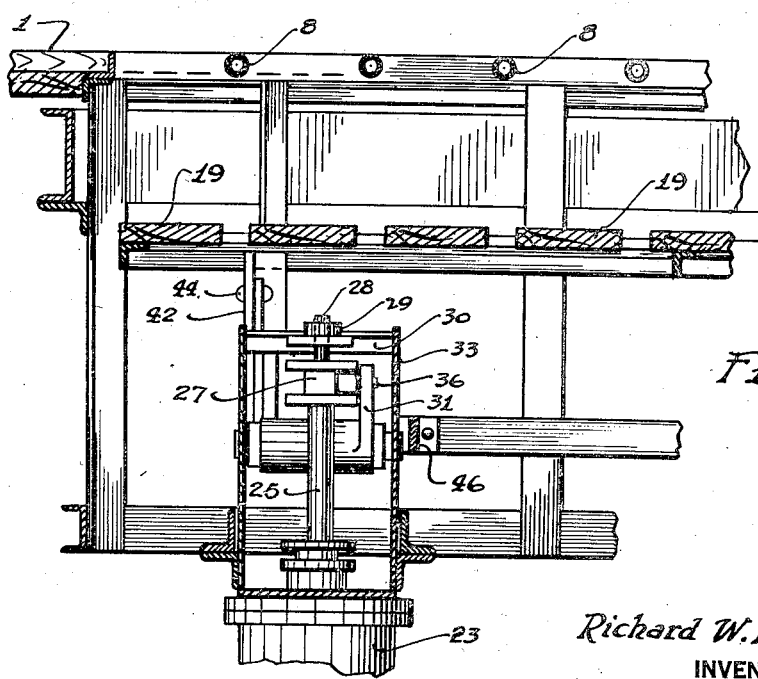
Fig. 6
Richard W. Regensburger
INVENTOR
WITNESS
BY 
ATTORNEY Patented Dec. 24, 1935

2,025,124

UNITED STATES PATENT OFFICE 2,025,124

STUNNING PEN

Richard W. Regensburger, Chicago, Ill., assignor to Industrial Patents Corporation, Chicago, Ill., a corporation of Delaware Application July 10, 1933, Serial No. 679,660

12 Claims. (Cl. 17—1)

This invention relates to stunning pens for use in slaughtering animals.

One of the objects of the invention is to provide a means whereby living animals may be held in a quiescent position appropriate for stunning by electrical means. Another object of the invention is to provide a stunning pen floor, selected portions of which are movable relative to the remaining portions whereby the bodies of living animals may be supported with the legs and feet in a dangling position.

Other objects of the invention will be apparent from the description and claims which follow.

The invention is particularly adaptable for use in the slaughtering of hogs. For convenience, the invention will be described as used in connection with the slaughtering of hogs. It will be understood that this is merely by way of illustration and not by way of limitation since the invention may be practiced in and about the slaughter of other animals and for other purposes.

It is common practice in abattoirs, in the slaughter of hogs, to drive a number of the animals into an enclosure called a shackling pen. On one side of the shackling pen a large wheel revolves. An operator, designated as a shackler, shackles each hog by seizing one hind leg, wrapping a length of chain about the leg, forming a bight and securing a hook at the end of the chain to the standing part of the chain. The free end of the chain, which is provided with means adapted to slide upon a rail, is hung upon a lug on the face of the wheel. The revolving wheel carries the animal from the floor. On the downward sweep of the wheel, the animal is carried by the shackle upon a rail inclined sufficiently to cause the suspended animal to slide by the action of gravity to the killing station. At this point an operator inserts a knife into the throat and pierces the jugular vein.

It has been proposed to stun hogs by electric current before they are stuck. A preferred method of stunning hogs is to apply electrodes on each side of the head, sending an electric current through the brain. It is not the object of electric stunning to kill the animal by electrocution but merely to render the animal unconscious for a sufficient length of time to permit completion of the operations necessary to slaughter.

In large scale slaughtering operations it is necessary that the slaughtering be performed quickly and with a minimum expenditure of effort. It is impracticable to stanchion individually each animal for stunning due to the quantity of equipment and labor which would be required.

The present invention provides a means whereby a plurality of animals may be held as securely as if individually stanchioned, stunned while so held and conveniently handled for slaughtering.

My invention provides a combined stunning and shackling pen which, in the embodiment shown in the drawings, is placed adjacent a shackling wheel. The pen may be of any desired size but as shown in the drawings is large enough to accommodate six to ten hogs.

In the accompanying drawings, similar reference characters in the several figures designate similar parts.

Figure 5 is a view showing the linkage mechanism in Figure 3 with the floor in the lower position.

Figure 6 is a view partly in section through 6—6 of Figure 4.

Figure 1:
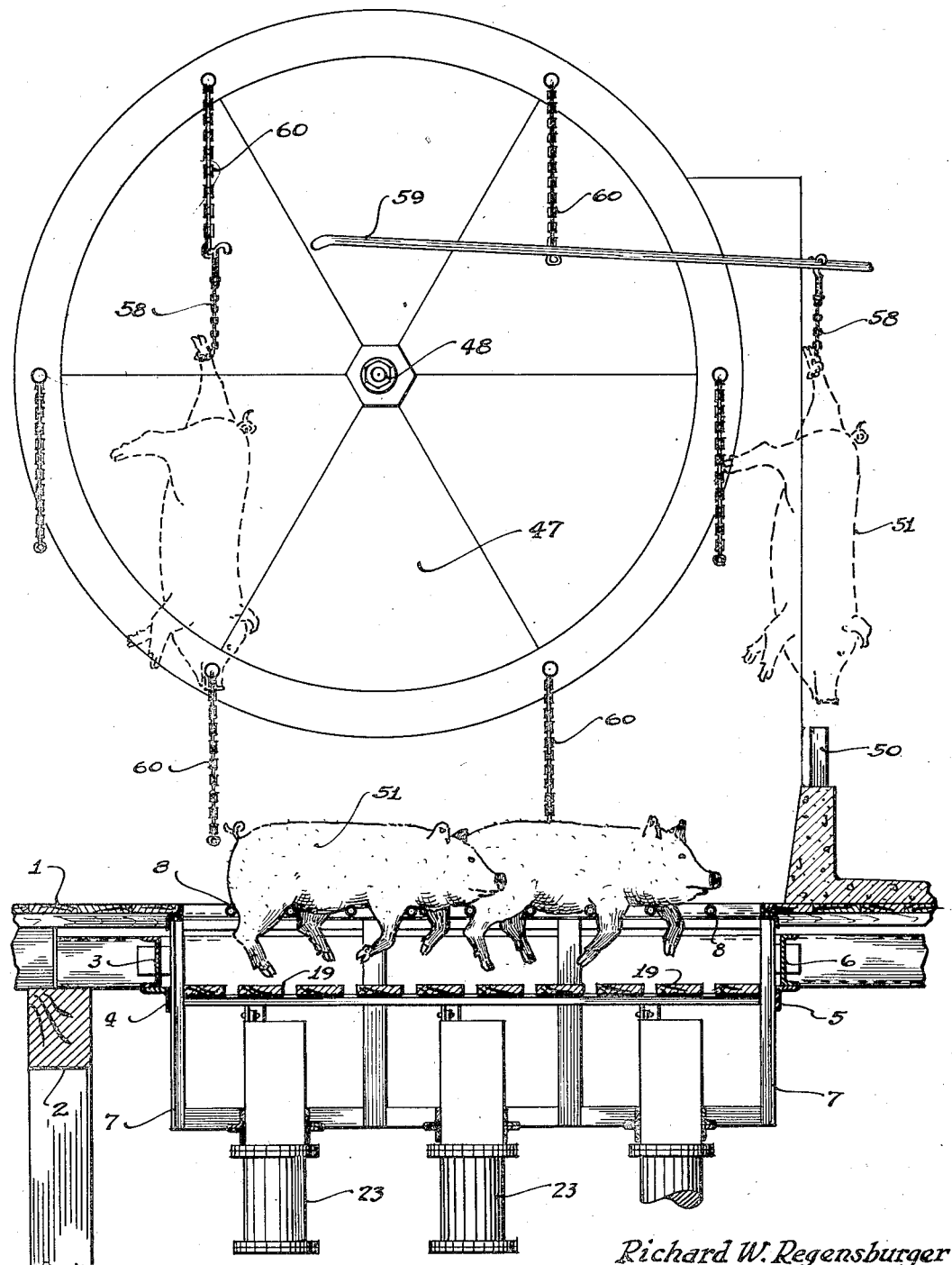
Figure 1 is a side view of a stunning pen constructed in accordance with the present invention, partly in section, showing an adjacent shackling wheel.

It will be seen from the specific description which follows that the stunning pen which is the subject matter of the present invention, provides a floor that remains level and continuous while the animals are being penned, breaks its continuity to constrain the animal during stunning and regains its continuity after stunning to deliver the stunned animal for shackling and leaves the pen ready for reloading.

In the embodiment shown in the drawings, the floor is made up of a plurality of alternate boards and pipes, the pipes remaining fixed and stationary and the boards arranged in a system which may be lowered so that the legs of the animals fall through the spaces between the pipes and hang free. The stunning pen is shown in the drawings fixed in a building having a floor I secured to the sill work 2 by angle irons 3, 4, 5, 6, 13, 14, 15, 16, 17 and 18 contained in a framework 7. The pipes 8 are secured by any appropriate means at the side of the pen as at 9 and 10 as in Figure 2 where they are shown as resting on sides 11 and 12.

The boards 19, which, as shown in the drawings, are preferably wider than the pipes, are mounted on angle irons 20 and 21, being spaced such that when the boards and pipes lie in the same plane, a continuous floor is formed. The boards are moved as a unit by the action of pistons 22 operating in cylinders 23 transmitting power through linkage systems 24.

Figure 3:
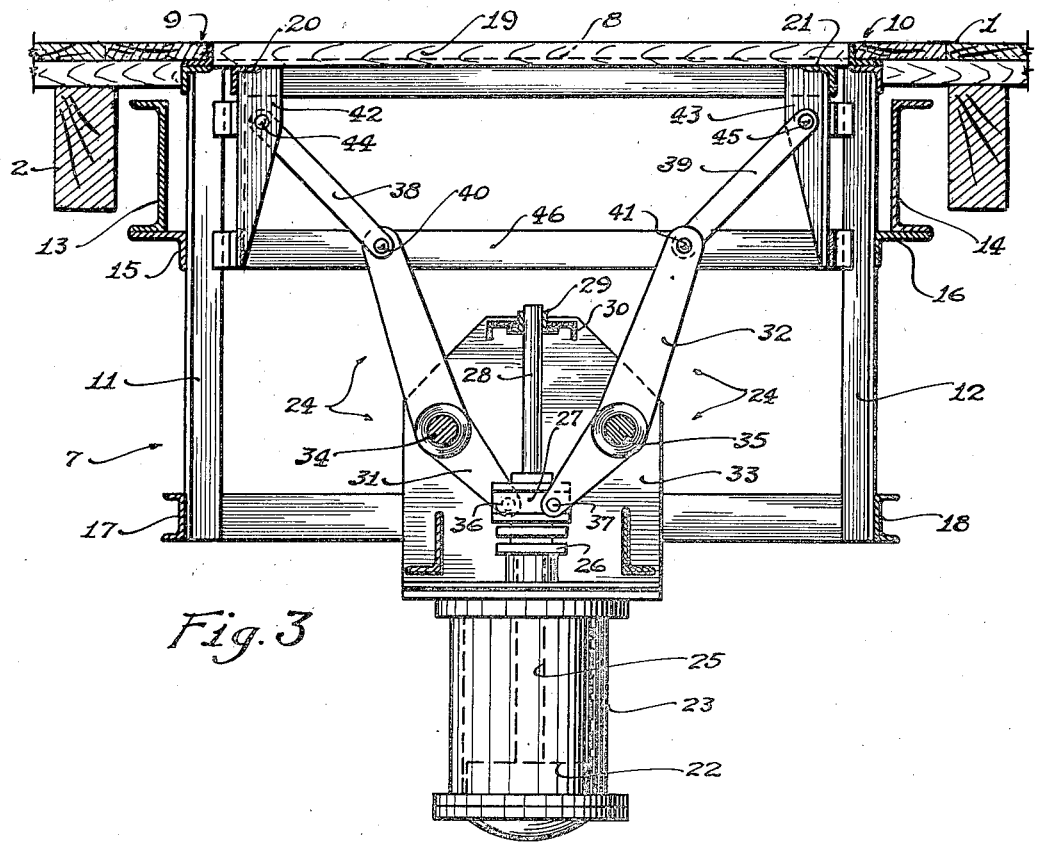
Figure 3 is a detail end view partly in section showing the linkage mechanism utilized to cause a desired portion of the floor to drop.
Figure 4:
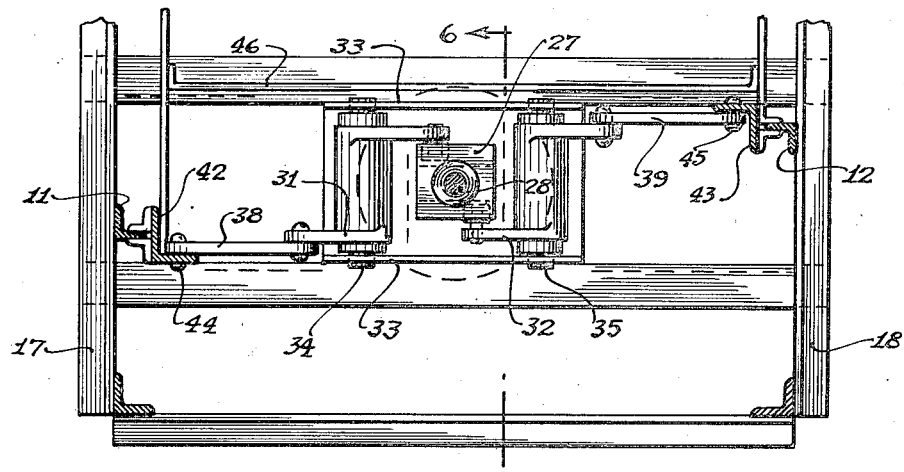
Figure 4 is a top view of the linkage mechanism shown in Figure 3.

The preferred form of linkage system for operating the floors is shown in Figures 3, 4, 5, and 6. In Figure 3 the floor is shown in the penning or shackling position. In Figure 5 the floor is shown in the stunning position. Piston 22 may be operated in cylinder 23 by compressed air, steam or hydraulic pressure, the cylinder shown being particularly adapted for use with steam. The plunger 25 operates through packing gland 26 and is rigidly affixed to collar 27 which slides on rod 28 which is rigidly held in collar 29 mounted in angle 30. It will be noted that plunger 25 is hollow and, therefore, adapted to pass over rod 28. Bell cranks 31 and 32 are pivoted on plate 33 as at 34 and 35 on collar 27 at 36 and 37 and pivoted to links 38 and 39 as at 40 and 41. Links 38 and 39 are pivoted on brackets 42 and 43 as at 44 and 45. Brackets 42 and 43 are rigidly affixed to angles 20 and 21 and to truss 46.

It will be seen by reference to Figures 3 and 5 that when the plunger is forced up by the movement of the piston the linkage system will assume the position shown in Figure 5, lowering the board portion of the floor to the position which is clearly shown in Figures 1 and 5.

In operation, the hogs are driven to the stunning and shackling pen, defined on one side by a wheel 47 mounted on shaft 48 and on the other side by fence 49, at one end by fence 50 and at the other end by a gate not shown.

After the desired number of hogs 51 has been driven into the pen, the boards 19 are caused to drop by operation of the linkage system. After the desired number of hogs 51 has been driven into the pen and the boards 19 dropped as aforesaid, the hogs may be stunned by an operator using an appropriate tool.

Figure 2:
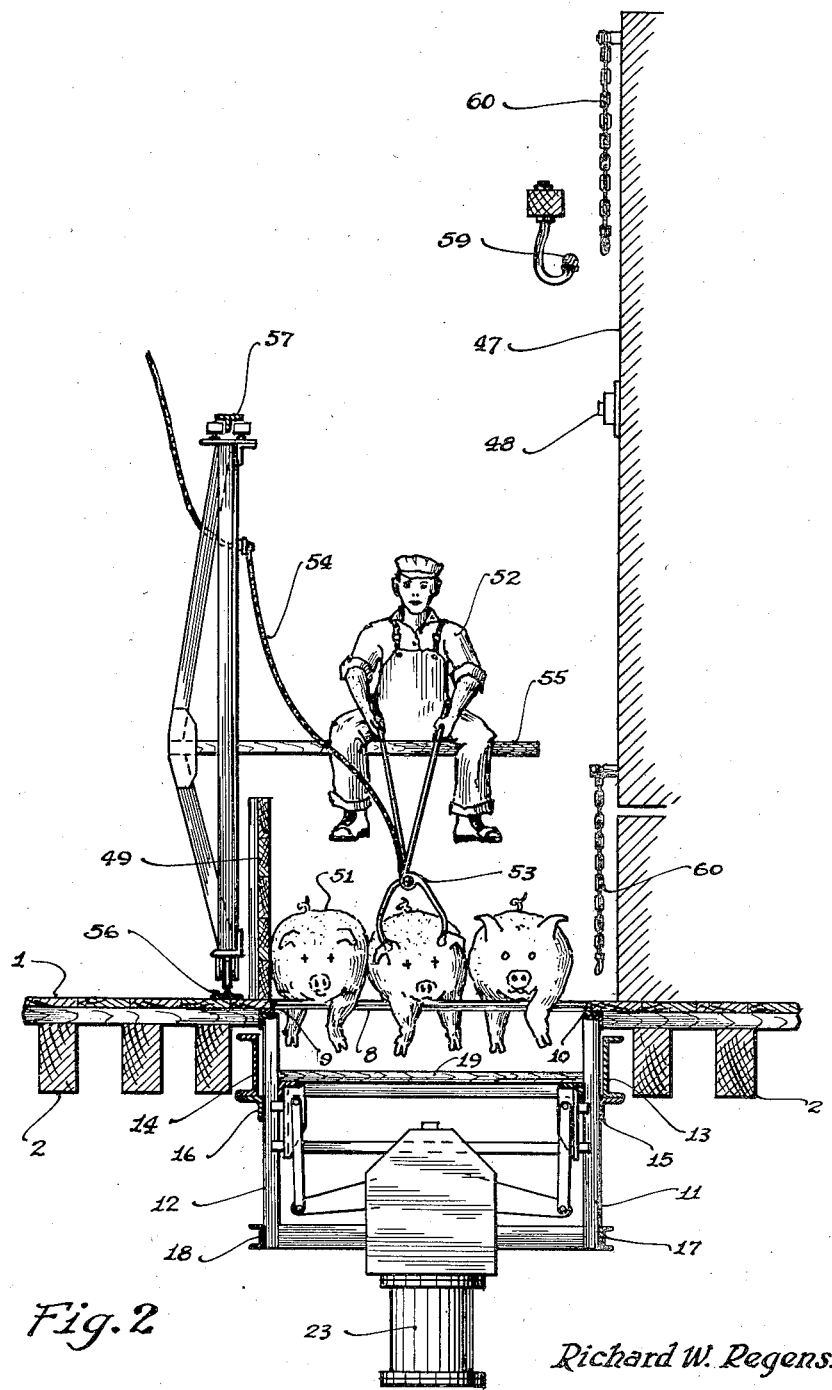
Figure 2 is an end view partly in section showing one manner in which an operator may electrically stun hogs held in the pen.

In Figure 2 an operator 52 is shown manipulating a pair of tongs 53 provided with electrodes supplied with current through line 54. The operator is shown as seated on a movable carriage 55 adapted to slide on rails 56 and 57.

After stunning, the boards 19 are returned to the up position and the operator shackles each hog by engaging shackle 58 with one hind leg, hooking the shackle on the wheel 47 which rotates in a clockwise direction. After the hook passes the rail 59, shackle 58 is taken from the wheel chain 60 by rail 59 and the stunned hog passes down the rail for sticking.

I claim:

1. A pen of the class described comprising a floor in two sections, one of which sections is adapted to be moved vertically.

2. A pen of the class described including a floor in two sections, each section comprising spaced members alternating with the members of the other section and adapted for vertical movement relative to each other.

3. A pen of the class described including a floor comprising alternate wide and narrow members, the wide members forming one section and the narrow members another section, and means for breaking the continuity of the floor by moving one section vertically.

4. A pen of the class described including a floor comprising alternate relatively wide and narrow members in a horizontal plane, the wide members forming one system and the narrow members forming an independent system, and means for breaking and remaking the continuity of the floor by lowering and raising one system.

5. A pen of the class described including a floor comprising alternate relatively wide and narrow members in a horizontal plane, the wide members forming one system and the narrow members forming an independent system, and means for breaking and remaking the continuity of the floor by lowering and raising one system, including a linkage system in operative relationship with the movable system.

6. A pen of the class described including a floor comprising alternate relatively wide and narrow members in a horizontal plane, the wide members forming one system and the narrow members forming an independent system, and means for breaking and remaking the continuity of the floor by lowering and raising one system, said means for lowering and raising said movable system, including a cylinder, a piston movable therein, bell cranks and links operatively associated with said piston and with said system of narrow members.

7. A pen of the class described including a floor comprising alternate relatively narrow and wide members in a horizontal plane, the narrow members being fixed in the said plane, the wide members forming an independent system, and means for breaking and remaking the continuity of the floor by lowering and raising the wide members.

8. A pen of the class described including a floor comprising alternate relatively narrow and wide members in a horizontal plane, the narrow members being fixed in the said plane, the wide members forming an independent system, and means for breaking and remaking the continuity of the floor by lowering and raising the wide members, including a linkage system in operative relationship with said wide members.

9. A pen of the class described including a floor comprising alternate relatively narrow and wide members in a horizontal plane, the narrow members being fixed in the said plane, the wide members forming an independent system, and means for breaking and remaking the continuity of the floor by lowering and raising the wide members, said means for lowering and raising said wide members, including a cylinder, a piston movable therein, bell cranks and links operatively associated with said piston and with said system of wide members.

10. A shackling and stunning pen comprising a frame work providing a floor level, relatively wide boards affixed as a unitary system, spaces between each board, a plurality of pipes forming another unitary system and arranged to lie in the spaces between the boards, providing a continuous floor, cylinders, pistons operable therein, and bell cranks separated by said pistons communicating with said framework through links, said bell cranks and links comprising linkage systems adapted to lower and raise one of said systems to break and remake the continuity of the floor.

11. A shackling and stunning pen comprising a framework providing a floor level, pipes affixed at said floor level to said framework, spaces between each pipe, a plurality of relatively wide boards arranged to set in the spaces between the pipes providing a continuous floor, said boards affixed to a movable framework, cylinders, pistons operable therein, and bell cranks separated by said pistons communicating with said framework through links, said bell cranks and links comprising linkage systems adapted to lower and raise said boards to break and remake the continuity of the floor.

12. A pen of the class described including a floor constructed of two sections, one section comprising relatively wide members, the other section comprising pipes, the members of one section being arranged alternately to the pipes of the other section whereby a continuous floor is provided, one of the sections being adapted to move vertically whereby the continuity of the floor may be broken.

RICHARD W. REGENSBURGER.